US012072688B2

(12) United States Patent
Mazur et al.

(10) Patent No.: US 12,072,688 B2
(45) Date of Patent: Aug. 27, 2024

(54) DYNAMIC ROUTING AND EDGE ORCHESTRATION FOR INDUSTRIAL AUTOMATION DATA

(71) Applicant: ROCKWELL AUTOMATION TECHNOLOGIES, INC., Mayfield Heights, OH (US)

(72) Inventors: David C. Mazur, Mequon, WI (US); Rob A. Entzminger, Shawnee, KS (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/940,826

(22) Filed: Sep. 8, 2022

(65) Prior Publication Data

US 2024/0085889 A1  Mar. 14, 2024

(51) Int. Cl.
    *G05B 19/418* (2006.01)
(52) U.S. Cl.
    CPC ... *G05B 19/4186* (2013.01); *G05B 19/41885* (2013.01); *G05B 2219/25064* (2013.01)
(58) Field of Classification Search
    None
    See application file for complete search history.

(56) References Cited

U.S. PATENT DOCUMENTS

| | | | |
|---|---|---|---|
| 10,503,448 B1 | 12/2019 | Chhabra et al. | |
| 10,715,388 B2 | 7/2020 | Fildebrandt et al. | |
| 11,182,206 B2 | 11/2021 | Jung et al. | |
| 11,474,873 B2 | 10/2022 | Biernat et al. | |
| 11,513,877 B2 | 11/2022 | Biernat et al. | |
| 2018/0024537 A1 | 1/2018 | Chauvet et al. | |
| 2018/0054469 A1 | 2/2018 | Simoncelli | |
| 2019/0377604 A1 | 12/2019 | Cybulski | |

(Continued)

FOREIGN PATENT DOCUMENTS

| KR | 20200027783 A | 3/2020 |
|---|---|---|
| WO | 2020184362 A1 | 9/2020 |

OTHER PUBLICATIONS

Liu, Yu, et al. "A data-centric internet of things framework based on azure cloud." IEEE Access 7 (2019): 53839-53858. (Year: 2019).*

(Continued)

*Primary Examiner* — Carlos R Ortiz Rodriguez
(74) *Attorney, Agent, or Firm* — Fletcher Yoder, P.C.

(57) ABSTRACT

A non-transitory computer-readable medium includes instructions that, when executed by processing circuitry, cause the processing circuitry to receive, from an edge device of an industrial automation system, data indicative of a type of one or more devices in the industrial automation system, one or more types of data generated by the one or more devices, one or more components included in the one or more devices, firmware of the one or more devices, or any combination thereof. When executed, the instructions also cause the processing circuitry to identify, based on the received data, either a firmware update for the industrial automation system or, from a container repository, a container that is implementable on the edge device. Additionally, when executed, the instructions cause the processing circuitry to cause a container image for the container or firmware update for the firmware to be sent to the edge device.

13 Claims, 4 Drawing Sheets

(56) References Cited

U.S. PATENT DOCUMENTS

| | | |
|---|---|---|
| 2020/0136906 A1 | 4/2020 | Bernat et al. |
| 2020/0249928 A1 | 8/2020 | Zeng et al. |
| 2020/0278892 A1 | 9/2020 | Nainar et al. |
| 2020/0311617 A1 | 10/2020 | Swan et al. |
| 2021/0200814 A1 | 7/2021 | Tal et al. |
| 2021/0218617 A1 | 7/2021 | Palavalli et al. |
| 2021/0382727 A1 | 12/2021 | Vigil et al. |
| 2022/0027721 A1 | 1/2022 | Thoemmes et al. |
| 2022/0091572 A1 | 3/2022 | Biernat et al. |
| 2022/0091583 A1 | 3/2022 | Biernat et al. |

OTHER PUBLICATIONS

Extended European Search Report for European Patent Application No. 21179775.8, dated Nov. 25, 2021, 9 pages.
Partial European Search Report for European Patent Application No. 21180068.5, dated Dec. 8, 2021, 17 pages.
Marshall, "Industry 4.0: The PLC evolves from Controller to Cloud Interface," Feb. 9, 2018, https://www.rs-online.com/designspark/evolution-of-the-industrial-plcfrom-controller-to-cloud-interface , retrieved on Nov. 29, 2021, pp. 1-6.
European Search Report for European Patent Application No. 21180068.5, dated Mar. 28, 2022,19 Pages.
Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.
European Search Report for European Patent Application No. 21180279.8, dated Apr. 19, 2022,12 Pages.
D. Elliott, C. Otero, M. Ridley and X. Merino, "A Cloud-Agnostic Container Orchestrator for Improving Interoperability," 2018 IEEE 11th International Conference on Cloud Computing (Cloud), 2018, pp. 958-961, doi: 10.1109/CLOUD.2018.00145. (Year: 2018).
A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).
Liu, Y. et al., "A Data-Centric Internet of Things Framework Based on Azure Cloud," IEEE Access, vol. 7, Mar. 27, 2019, 20 pages.
European extended search report for EP Application No. 23187189.8 dated Jan. 19, 2024; 10 pages.

* cited by examiner

DYNAMIC ROUTING AND EDGE ORCHESTRATION FOR INDUSTRIAL AUTOMATION DATA

BACKGROUND

This disclosure relates generally to industrial automation, and, more specifically, to employing software containers within industrial automation systems.

Industrial automation systems are managed and operated using automation control and monitoring systems (e.g., industrial control system), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, industrial control systems operate in the operational technology (OT) environment are used to control industrial devices accessible via an OT network. Although the industrial control systems may be used to manage the operations of the devices within the OT network, there may be additional processes that can be performed with the devices, data generated by the devices that is unused or could be used for more purposes, and there may be devices that are not known to computing devices in the information technology (IT) environment.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one embodiment, a non-transitory computer-readable medium includes instructions that, when executed by processing circuitry, cause the processing circuitry to receive, from an edge device of an industrial automation system, data indicative of a type of one or more devices in the industrial automation system, one or more types of data generated by the one or more devices, one or more components included in the one or more devices, firmware of the one or more devices, or any combination thereof. When executed, the instructions also cause the processing circuitry to identify, based on the received data, either a firmware update for the industrial automation system or, from a container repository, a container that is implementable on the edge device. Additionally, when executed, the instructions cause the processing circuitry to cause a container image for the container or firmware update for the firmware to be sent to the edge device.

In another embodiment, a computing device includes processing circuitry and a non-transitory computer-readable medium having instructions that, when executed by the processing circuitry, cause the processing circuitry to receive, from an edge device of an industrial automation system, data indicative of a type of one or more devices in the industrial automation system, one or more types of data generated by the one or more devices, one or more components included in the one or more devices, firmware of the one or more devices, or any combination thereof. When executed, the instructions also cause the processing circuitry to determine, based on the received data, a firmware update for the industrial automation system or a container implementable on the edge device from a container repository. Additionally, when executed, the instructions cause the processing circuitry to cause a container image for the container or firmware update for the firmware to be sent to the edge device.

In yet another embodiment, an industrial automation system includes one or more industrial automation devices configured to perform a first industrial process or a portion thereof. The industrial automation system also includes an edge device that is communicatively coupled the one or more industrial automation devices. The edge device includes processing circuitry that is configured to receive, from a cloud computing system, a request for data indicative of a type of one or more industrial automation devices in the industrial automation system, one or more types of data generated by the one or more industrial automation devices, one or more components included in the one or more industrial automation devices, firmware of the one or more industrial automation devices, or any combination thereof. The processing circuitry is also configured to send the data to the cloud computing system in response to receiving the request. Furthermore, the processing circuitry is configured to receive a container image or a firmware update from the cloud computing system after sending the data to the cloud computing system.

DETAILED DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present application is generally directed to techniques that may be implemented in industrial automation systems that employ (software) containers, which are packages of software that may visualize an operating system and be deployed and run on one or more computing devices. As discussed herein, a container agent may receive data regarding devices in an industrial automation system, components of the devices, software or firmware installed on the devices, networks employed in the industrial automation system, and characteristics of the networks. The container agent may, based on the received data, determine one or more solutions that, when implemented by one or more devices of the industrial automation system, may add functionality to the industrial automation system, enable data to be analyzed in a manner not previously used, or enable the industrial automation system to harness data in a different manner. As such, the container agent may determine particular container images or firmware updates and cause the container images (or data for the container images), the firmware updates, or both to be sent to an edge device of the industrial automation system. For example, as discussed below, the container agent may determine that containers corresponding to preventative maintenance applications, power consumption applications, or manufacturing execution system applications may be implemented in an industrial automation system based on the types of devices in the industrial automation system, the components of the devices in the industrial automation system, types of data generated by the devices of the industrial automation system, firmware on the one or more industrial device, or a combination thereof.

Figure 1:
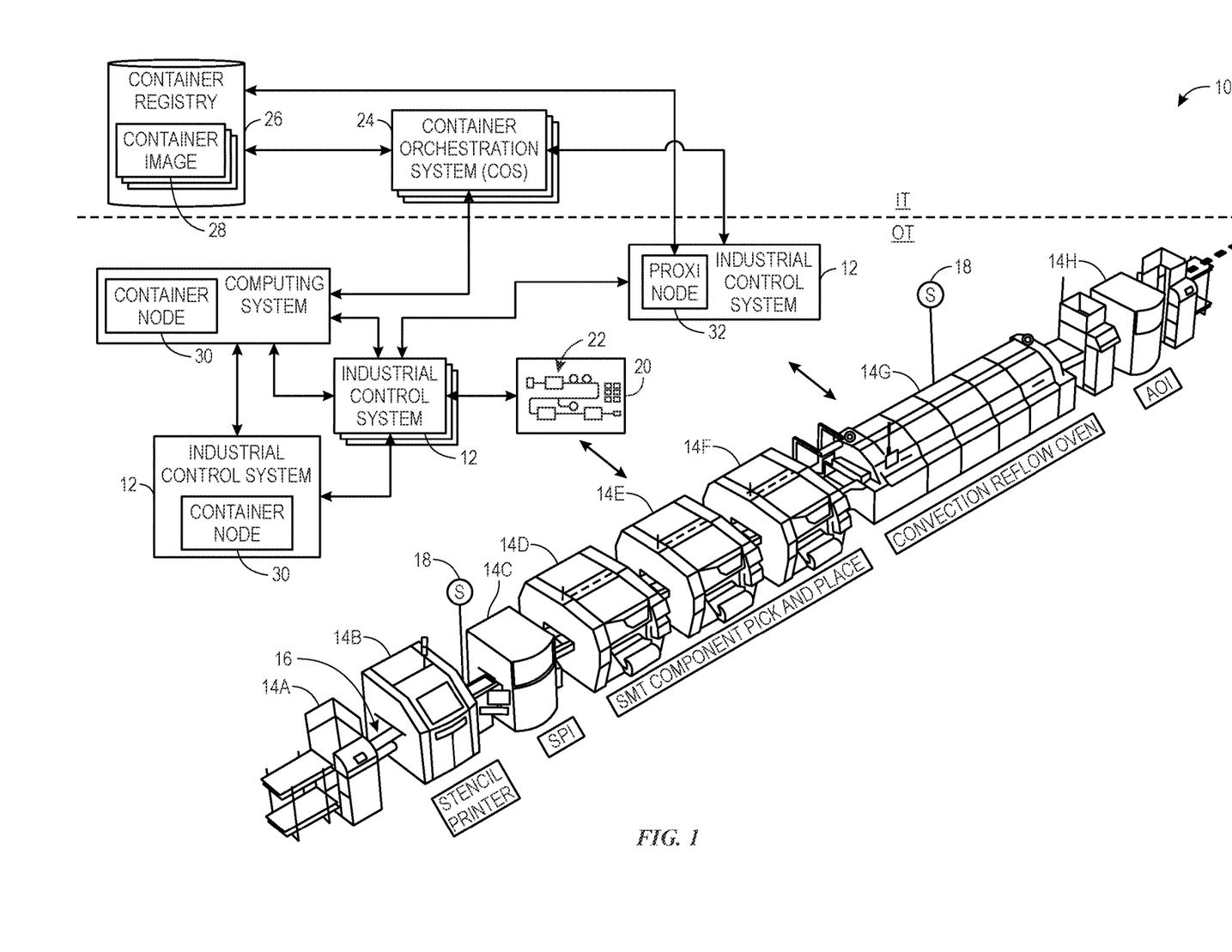
FIG. 1 is a perspective view of an example industrial automation system, in accordance with an embodiment.

By way of introduction, FIG. 1 is a perspective view of an example industrial automation system 10 controlled by one or more industrial control systems 12. The industrial automation system 10 includes stations 14 having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to station 14D, station 14E, and station 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14 of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling of containers, provisioning and deployments of containers, determining availability of containers, configuring applications in terms of the containers that they run in, scaling of containers to equally balance application workloads across an infrastructure, allocating resources between containers, performing load balancing, traffic routing and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications. In some embodiments, the container orchestration system 24 may be implemented using one or more cloud-based computing devices. Accordingly, the container orchestration system 24 may be partially or wholly implemented using cloud-computing resources.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective file system to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
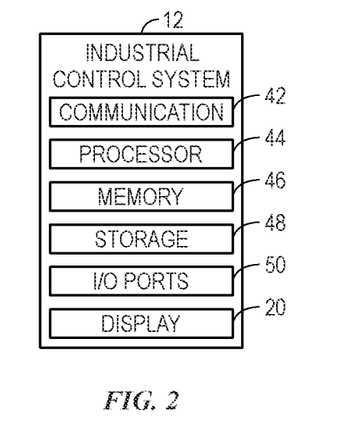
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
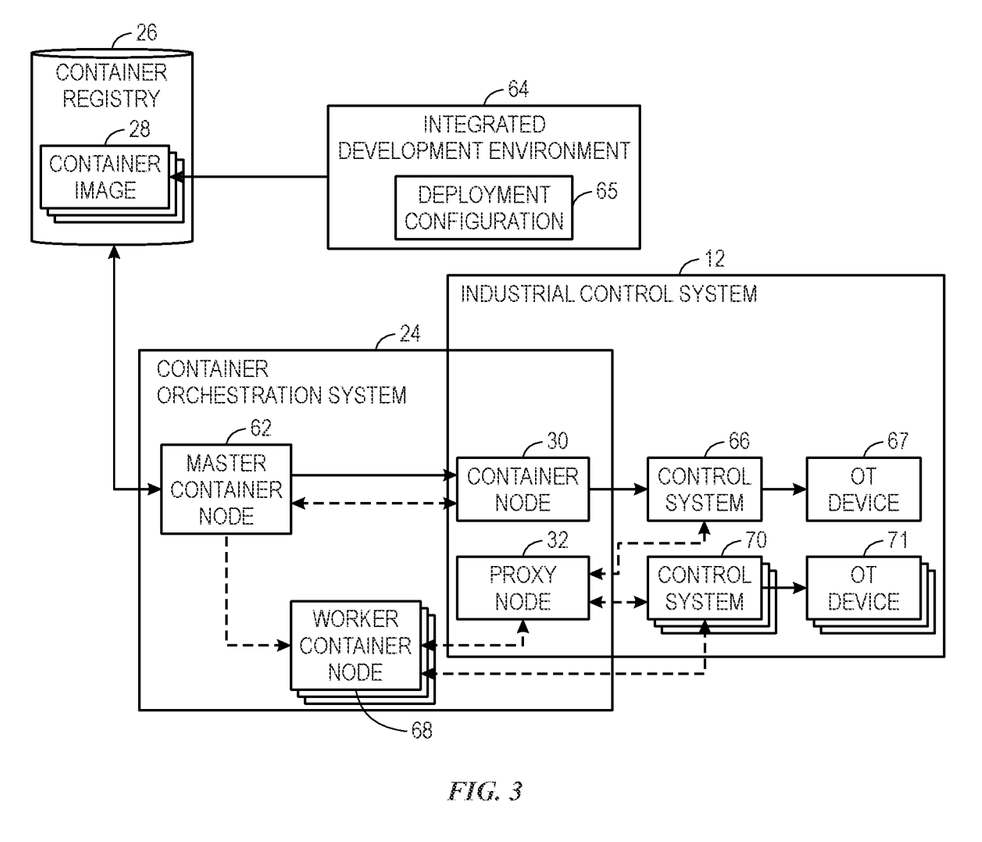
FIG. 3 is a block diagram of an example operational technology (OT) network that coordinates with a container orchestration system, in accordance with an embodiment.

With the foregoing in mind, FIG. 3 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 3, the container orchestration system 24 may include a master node 62 that may execute control plane processes for the container orchestration system 24. The control plane processes may include the processes that enable the container orchestration system 24 to coordinate operations of the container nodes 30 to meet the desired states. As such, the master container node 62 may execute an application programming interface (API) for the container orchestration system 24, a scheduler component, core resources controllers, and the like. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the container host nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk Live Data, EtherNet/IP. Common Industrial Protocol (CIP), OPC Direct Access (e.g., machine to machine communication protocol for industrial automation developed by the OPC Foundation), or any suitable OT communication protocol (e.g. DNP3, Modbus, Profibus, LonWorks, DALI, BACnet, KNX, EnOcean). Since the industrial control systems 12 operate in the OT space, the industrial control systems are not capable of implementing commands received via the container orchestration system 24.

In certain embodiments, the container node 30 may be programmed or implemented in the industrial control system 12 to serve as a node agent that can register the industrial control system 12 with the master container node 62. For example, the industrial control system 12 may include a programmable logic controller (PLC) that cannot support an operating system (e.g., Linux) for receiving and/or implementing requested operations issued by the container orchestration system 12. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

As such, the control system 66 may perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestrations system 24 and the OT-based industrial control system 12.

In addition, the proxy node 32 may also perform certain supervisory operations based on its analysis of the machine state data of the respective control system 66. As a result of its analysis, the proxy node 32 may issue commands and/or pods to other nodes that are part of the container orchestration system 24. For example, the proxy node 32 may send instructions or pods to other worker container nodes 68 that may be part of the container orchestration system 24. The worker container nodes 68 may corresponds to other container nodes 30 that are communicatively coupled to other control systems 70 for controlling other OT devices 71. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system to coordinate the activities of multiple control systems 66 and 70 to achieve a collection of desired machine states for the connected OT devices 67 and 71.

Bearing the discussion of FIGS. 1-3 in mind, when utilizing an edge orchestration, there may be networks, devices, or both that are unknown from the perspective of devices or systems that are located outside of a particular system. For example, devices that operate or communication networks within the OT space may be unknown to devices or systems in the IT space, such as a cloud-computing system. Edge devices in the OT space may be communicatively coupled to both a device or system in the OT space as well as other devices in the OT space. For instance, in the context of FIG. 1, the industrial control system 12 (that includes the proxy node 32) and the computing system that are illustrated as being communicatively coupled to the container orchestration system 24 may act as edge devices that can share data between the OT space and the IT space. As discussed above, as more information regarding the OT space (e.g., devices and capabilities) are determined container-based solutions may be provided to expand the functionality of the industrial automation system 10 or to enable the industrial automation system 10 to have new capabilities.

Figure 4:
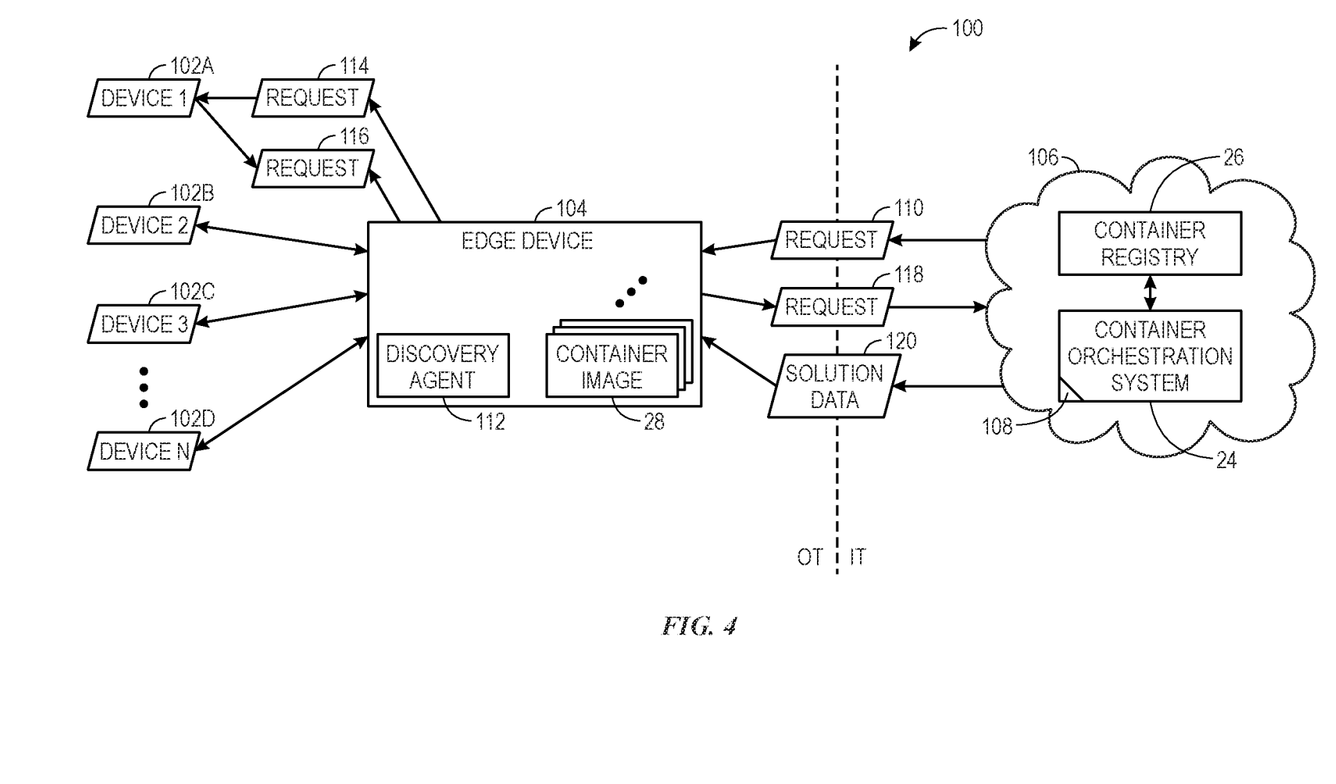
FIG. 4 is a block diagram of an industrial automation system, in accordance with an embodiment.

Keeping this in mind, FIG. 4 is a block diagram of an industrial automation system 100. As illustrated, the industrial automation system 100 includes devices 102 (referring collectively to devices 102A-102D), an edge device 104, and a cloud computing system 106. The industrial automation system 100 may be implemented using components in the industrial automation system 12 of FIG. 1 and FIG. 3. For instance, the devices 102 may be industrial automation devices such as the industrial controller system 12, stations 14 (referring collectively to stations 14A-14-H), the conveyer section 16, the sensors 18, the display/operator interface 20, devices that implement the container node 30 and proxy node 32, and the OT device 67. The edge device 104 may be the computing system that implements the container node 30 or the industrial control system 12 that implements the proxy node 32. The cloud-computing system may be an IT side device or devices that implement the container orchestration system 24 and the container registry 26.

Utilizing components of the industrial automation system 12 is one example implementation of the industrial automation system 100. In other embodiments, the devices 102 may be industrial automation devices such as, but not limited to, motor control centers, motors, HMIs, operator interfaces, contactors, starters, sensors, drives, relays (e.g., overload relays), protection devices, switchgear, compressors, network switches (e.g., Ethernet switches, modular-managed, fixed-managed, service-router, industrial, unmanaged, etc.), controllers, and the like. Furthermore, while the industrial automation system 100 is illustrated as having four devices 102, in other embodiments, the industrial automation system 100 may include any suitable number of devices 102 that are communicatively coupled to the cloud computing system 106 via the edge device 104.

The edge device 104 may be a device a computing device or industrial automation device on the OT side that is communicatively coupled to the device 102 and communicatively couples the devices 102 to the cloud computing system 106, which is located on the IT side. In some embodiments, the edge device 104 may be a device such as a controller or a drive. In any case, the edge device 104 may include processing circuitry (e.g., one or more processors) that executes machine-readable instructions that may be stored on memory or storage (e.g., a non-transitory computer-readable medium) included in the edge device 104.

The cloud computing system 106 may be implemented using one or more computing devices that have processing circuitry that can execute machine-readable instructions that may be stored on memory or storage (e.g., a non-transitory computer-readable medium) included in cloud computing system 106 or communicatively coupled to the processing circuitry device of the cloud computing system 106.

The devices 102 of the industrial automation system 100 may be various types of devices that may have various capabilities, collect (or provide) or utilize (e.g., consume) various types of data, and include various components that may also have particular capabilities or collect or utilize certain types of data. Furthermore, the OT side of the industrial automation system 100 may utilize a particular network topology (e.g., a star network or ring) for a network that communicatively coupled the devices of the OT side (e.g., the devices 102 and edge device 104). As described below with respect to FIG. 4 and FIG. 5, the cloud computing device 106 may implement a container agent 108 (e.g., software executed by processing circuitry of the container orchestration system 24) that may send requests 110 to the edge device 104 for information regarding the devices 102 or OT devices of the industrial automation system 10. In response to receiving the request 110, a discovery agent 112 (e.g., software executed by processing circuitry of the edge device 104) of the edge device 104 may generate and send requests 114 to the devices 102, which may send responses 116 to the edge device 104. Among other things, the requests 114 and responses 116 may pertain to a type of a particular device 102, capabilities of the device 102, types of data generated or utilized by the device 102, firmware or software on the device 102, or network information for the OT side of the industrial automation system 100. The discovery agent 112 may receive the responses 116 and send responses 118 to the container agent 108 of the cloud computing system 106 that are indicative or inclusive of data in the responses 116 (e.g., individually or after grouping the responses 116). The container agent 108 may process or otherwise analyze the responses 118 (or data regarding the devices 102 or the OT side of the industrial automation system 100), determine one or more potential solutions (e.g., containers, firmware or updates) that may be implemented (e.g., by the edge device 104) to expand the capabilities or functionality of the devices 102 or edge device 104, and send the determined solution(s) (e.g., solution data 120).

Figure 5:
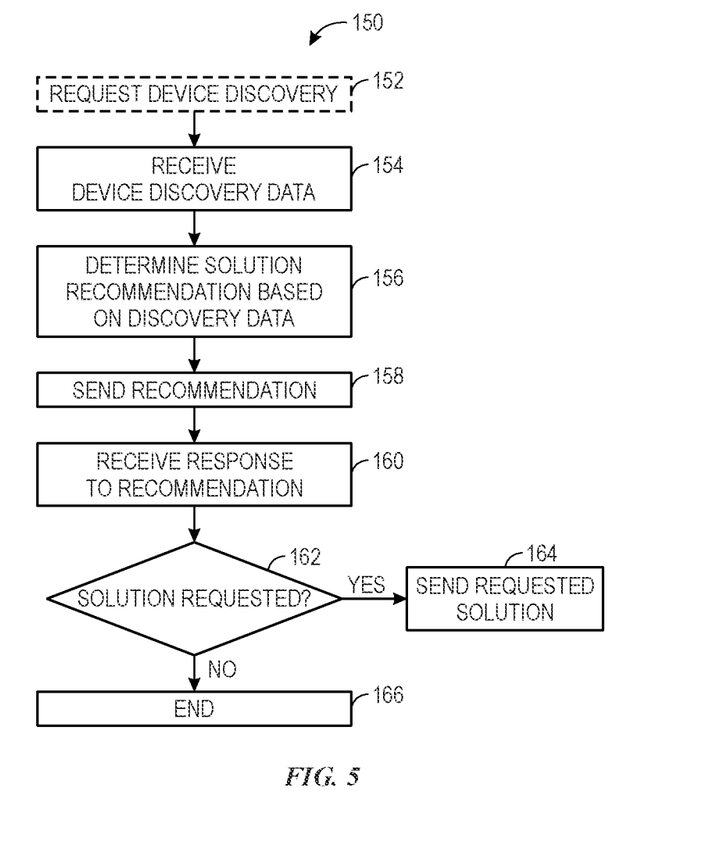
FIG. 5 is a flow diagram of a process for providing container-based, firmware, and software solutions for an industrial automation system, such as in the industrial automation systems of FIG. 1 and FIG. 4, in accordance with an embodiment.

With this in mind, FIG. 5 is a flow diagram of a process 150 for providing container-based, firmware, and software solutions for an industrial automation system, such as the industrial automation system 12 or the industrial automation system 100. The process 150 may be implemented by the container orchestration system 24 or the cloud computing system 106 by executing computer-readable instructions, for example, for the container agent 108. Before describing the process 150, it should be noted that while the process 150 is described below as having operations that are performed in one order, in other embodiments, the process 150 may omit some of the operations described below, the operations may be performed in a different order, or both omit some operations and have operations performed in a different order.

At process block 152, the cloud computing system 106 (or, more specifically, the container agent 108 implemented by the cloud orchestration system 24), may send a request for device discovery to an edge device. For example, with reference to FIG. 4, the request for device discovery may be the request 110 that is sent to the edge device 104. As noted above, in edge orchestration, there may be unknown networks and devices on those networks (e.g., OT networks). The request for device discovery may be a request for information regarding the devices 102, the edge device 104, and any networks of the industrial automation system 100. For example, the request 110 may be for information regarding the devices 102 (e.g., identities of the devices 102, what types of devices the devices 102 are), capabilities of the devices 102, data that can be generated or consumed by the devices 102, components of the devices 102, and software or firmware of the devices 102.

Upon receiving the request 110, the edge device 104 may generate and send requests 114 to the devices 102 to obtain information about the devices 102. For example, the discovery agent 112 may perform discovery services and browse networks (e.g., OT networks) to find devices (e.g., devices 102) that are connected to the same network(s) as the edge device 104 and send the requests 114 to the devices 102. Each of the devices 102 may respond to a received request 114 and provide the data requested by the request 114 (e.g., in the form of responses 116). The edge device 104 may generate the responses 118 based on the responses 116 received from the devices 102. The responses 118 may therefore include the information requested in the request 110 regarding the devices 102. The responses 118 may also include information regarding the network(s) (e.g., OT networks) utilizing the industrial automation system 100.

As an example, the edge device 104 may discover (e.g., based on a received response 116 from device 102A) that the device 102 is a drive as well as components included in the device 102A (e.g., fans, power modules, filters, etc.). As another example, the response 116 received from the device 102B may be indicative of the device 102B being an overload relay capable of providing energy data. As yet another example, the edge device 104 may determine networks and characteristics of the networks (e.g., network topologies) of the industrial automation system 100. Accordingly, the response 118 may include the networks in the industrial automation system 100 as well as the topologies of the networks.

Returning to FIG. 5 and the discussion of the process 150, at process block 154, the cloud computing system 106 may receive the device discovery data from the edge device 104, for example, in the form of the response 118. In other words, cloud computing system 106 (and the container orchestration system 24) may receive data regarding devices 102 (e.g., identities of the devices 102, what types of devices the devices 102 are), capabilities of the devices 102, data that can be generated or consumed by the devices 102, components of the devices 102, software or firmware of the devices 102, and networks (e.g., OT side networks) in the industrial automation system 100.

In embodiments of the process 150 in which process block 152 is omitted, the edge device 104 may generate the device discovery data without being prompted by the cloud computing system 106. For example, at periodic intervals or in response to software or firmware updates, a container being deployed on the edge device 104 (e.g., one of the container images 28), determining a new device has been connected to a network to which the edge device 104 is also connected, or the edge device 104 being deployed, the edge device 104 may send the requests 114 to the devices 102, receive the responses 116 from the devices 102, and generate and send the responses 118 to the cloud computing system 106. Accordingly, the edge device 104 may provide the response 118 without the cloud computing system 106 first sending the request 110.

At process block 156, container agent 108 of the cloud computing system 106 may determine a solution recommendation based on the discovery data received from the edge device 104. In other words, the container agent 108 may analyze the data received from the edge device 104 (e.g., responses 118) to determine which type of devices the devices 102 are, particular components included in the devices 102, types of data that the devices 102 may generate or consume, and network topologies of networks in the industrial automation system 100. Based on the received data as well as available containers (e.g., container images 28 maintained in the container registry 26), available firmware updates, or available software updates, the container agent 108 may determine one or more solutions that may be provided to the edge device 104, for example, to expand the functionality of the edge device 104 or another device in the industrial automation system 100. For example, the container agent 108 may utilize the received data and determine whether there is a container image 28 present in the container registry 26 (and not on the edge device 104 or a particular one of the devices 102) that could be utilized in conjunction with a particular type of device 102, component of a device 102, type of data, type of network indicated in the received data (e.g., the response 118). Moreover, the container agent 108 may determine whether there are available updates based on comparing version on device(s) to version maintained in storage communicatively coupled to cloud computing system 106 or based on records maintained by cloud computing system 106. Several examples of solutions that the container agent 108 may recommend are provided below.

As one example, the container agent 108 may determine what the devices 102 are (e.g., types of devices) and the replaceable components included in one or more of the devices 102. As such, the container agent 108 may determine that a containerized maintenance solution (e.g., a particular container image 28 of the container registry 26) could be provided to the edge device 104 to deploy the solution within the industrial automation system 100 (e.g., within edge device 104 itself). More specifically, the maintenance solution may be a container that, when deployed (e.g., as a container image 28 on the edge device 104 or elsewhere within the OT side of the industrial automation system 100), receives data regarding the devices 102 such as sensor data, a history or the devices 102 and components thereof (e.g., maintenance histories, operational histories, runtime operating parameters) and utilizes a (predictive) maintenance model (or updates the model based on the data) to determine and recommend maintenance operations that should be performed to the devices 102 or components thereof. For example, from a predictive maintenance standpoint, the maintenance solution may determine, based on the model, when part failures may occur and recommend replacing the part prior to its expected failure.

Another example of a container-based solution is an energy application. For example, in one embodiment, if the responses 118 indicate that the devices 102 (or a particular one of the devices 102) generates power data (e.g., electrical power consumed). The container image for the energy application may receive the power data to perform analytics regarding the power data, which can be used to make determinations regarding electrical power consumed by the devices 102 and the industrial automation system 100.

As yet another example, the container agent 108 may check for manufacturing execution system (MES) configurations for MES applications that may run on the edge device 104, one of the devices 102, or another device that may be included in the industrial automation system 100. In industrial automation systems (such as the industrial automation system 12 or industrial automation system 100), an enterprise resource planning (ERP) system may be implemented by computing devices. The ERP system may receive data regarding production, such as commands to produce a particular amount of a product or item manufactured by the industrial automation system. The ERP system may generate an order for the items to be manufactured and send the order to an MES application, which may dispatch the devices 102 of the industrial automation system 100 to perform a process to fulfill the order. In other words, the MES application may cause production of the items to fulfill the order. In the context of providing an MES solution, the container agent 108 may determine whether a particular device 102 or the edge device 104 has information (e.g., a particular type of data) or data structures for a particular MES application or version of the MES application and recommend an MES solution (e.g., MES software or a container image for an MES application) that can be deployed to the edge device 104. Moreover, based on the devices 102 in the industrial automation system 100 and firmware on the devices 102, the container agent 108 may determine what sorts of processes may be implementable in the industrial automation system 100 using the MES application. The container agent 108 may recommend such processes as part of an MES solution.

Accordingly, a new type of or control over performing a process may be possible using the device 102 of the industrial automation system 100.

As yet another example of a solution that the container agent 108 may determine, the container agent 108 may check for firmware or software updates for the edge device 104 or the devices 102. For example, the container agent may compare versions of software of firmware on the devices and well as device functionality associated with the versions to provide an information regarding upgrading or updating the firmware or software. For example, a firmware solution generated by the container agent 108 may be that if particular software or firmware were to be upgraded or updated, particular functionality would be added to one of the devices 102.

Continuing with the discussion of the process 150, at process block 158, the cloud computing system 106 may send a recommendation to the edge device 104. The recommendation may include an indication of the one or more solutions determines at process block 156. In other words, the recommendation may indicate containerized solutions, firmware updates, or software updates that may be provided to the edge device 104 to be implemented on the edge device 104 or a device 102 of the industrial automation system 100.

At process block 160, the cloud computing system 106 may receive a response from the edge device 104 regarding the recommendation. For example, the response may indicate whether to provide the recommended solution or not. In cases in which the recommended solution includes multiple items (e.g., multiple container images 28, firmware or software updates, or a combination thereof), the response may indicate which of the items should be provided to the edge device 104.

At decision block 162, the cloud computing system 106, or more particularly, the container orchestration system 24 or container agent 108, may determine whether the recommended solution should be provided to the edge device 104 based on the response received from the edge device 104. For instance, as noted above, the response from the edge device 104 may indicate which particular solution (e.g., container-based solution, firmware update, or software update), if any, should be provided. If the recommended solution (or at least one of several recommended solutions) is requested (as determined at decision block 162, at process block 164, the cloud computing system 106 or container orchestration system 24 may provide the recommended solution(s) to the edge device 104. For example, if the requested solution includes a firmware update, the cloud computing system 106 may cause the firmware update to be sent to the edge device 104 either by retrieving the firmware update and sending the firmware update to the edge device 104 or by causing a computing device communicatively coupled to the cloud computing system 106 to send the firmware update to the edge device 104. As another example, if the requested solution includes a container-based solution, the cloud computing system 106 may cause a container image 28 for the container for the sent to the edge device 104 by retrieving the underlying data for the container image 28 from the container registry 26 and sending the data for the container image 28 to the edge device 104.

However, if at decision block 162 the cloud computing system 106 determines that the recommended solution was not requested, at process block 166, the process 150 may end. In other words, the recommended solution is not provided to the edge device 106.

It should be noted that process 150 or portions thereof may be performed after a solution has been provided to the edge device 104. For example, the container agent 108 may continue to receive data (e.g., in responses 118) and check for additional solutions (e.g., new containers, updates for containers, or updates for firmware or software). Furthermore, the container agent 108 may also determine the compatibility of existing solutions (e.g., container images 28 deployed on the edge device 104) and firmware on the edge device 104 or devices 102. For example, when a solution was provided, a first version of firmware may have been installed on a device 102. However, at a later time, the firmware may have been updated to second version. The container agent 108 may determine whether the solution is compatible with the second version of the firmware and, if not, provide a solution recommendation. For instance, in the context of an MES solution, the container agent 108 may also determine that firmware has been changed from the first version to the second version and that the second version of the firmware is no longer compatible with a process implemented using the MES solution or the container image 28 for the MES solution. In such a case, the container agent 108 may determine whether another firmware update exists that would restore compatibility, and, if such an update exists, recommend the update to the edge device 104. The container agent 108 may also recommend reverting to the first version of the firmware.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the presently disclosed embodiments have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A non-transitory computer-readable medium comprising instructions that, when executed by processing circuitry, cause the processing circuitry to:
send a request to an edge device of an industrial automation system for information associated with a first set of operations of each of a plurality of devices communicatively coupled to the edge device, wherein the plurality of devices operate in an operational technology (OT) environment configured to communicate using one or more OT communication protocols, wherein the edge device is configured to communicatively couple to the plurality of devices and one or more information technology (IT) devices configured to communicate using one or more IT communication protocols in an IT environment;
receive, from the edge device, data indicative of one or more types of one or more devices of the plurality of devices, one or more types of data generated by the one or more devices, one or more operations performed by the one or more devices, and one or more components included in the one or more devices;
identify, based on the received data:
a container image stored in a container repository, wherein the container image comprises containerized maintenance software configured to utilize a maintenance model to determine one or more maintenance operations to be performed by the one or more devices;
retrieve the container image from the container repository;
send the container image to the edge device based on a desired machine state of the edge device; and
execute the container image, thereby causing the one or more devices to perform the one or more maintenance operations, wherein the one or more maintenance operations comprise adjusting the one or more operations of the one or more components to avoid maintenance.

2. The non-transitory computer-readable medium of claim 1, wherein:
the one or more types of data comprise energy data regarding electrical power consumed by the one or more devices; and
the instructions, when executed, cause the processing circuitry to:
determine, based on the one or more types of data, an additional container image stored in the container repository, wherein the additional container image corresponds to an energy application for analyzing the electrical power consumed by the one or more devices;
retrieve the additional container image from the container repository;
send the additional container image to the edge device based on the desired machine state of the edge device; and
execute the additional container image, thereby causing the one or more devices to analyze the electrical power consumed by the one or more devices.

3. The non-transitory computer-readable medium of claim 1, wherein the containerized maintenance software is configured to determine one or more preventative maintenance activities to be performed on the one or more components based on the maintenance model.

4. The non-transitory computer-readable medium of claim 1, wherein the one or more devices comprises a drive.

5. The non-transitory computer-readable medium of claim 1, wherein the instructions cause the processing circuitry to:
identify a firmware update for the one or more devices based on the received data, wherein the received data is indicative of firmware of the one or more devices;
determine, based on the firmware, an additional container image stored in the container repository, wherein the additional container image corresponds to updated firmware associated with a manufacturing execution system (MES) application for the one or more devices;
retrieve the additional container image from the container repository; and
execute the additional container image, thereby causing the one or more devices to update the firmware of the one or more devices with respect to the updated firmware.

6. The non-transitory computer-readable medium of claim 1, wherein the instructions cause the processing circuitry to:
identify a firmware update for the one or more devices based on the received data, wherein the received data is indicative of the firmware;

determine, based on firmware associated with the one or more devices, the firmware update; and cause the firmware update to be sent to the edge device.

7. The non-transitory computer-readable medium of claim 1, wherein, when executed, the instructions cause the processing circuitry to:

receive additional data regarding firmware of the one or more devices, wherein the additional data comprises a first version of the firmware;

determine, based on the additional data, that the firmware on the one or more devices corresponds to a second version of the firmware that is different than the first version;

retrieve an additional container image from the container repository in response to the second version of the firmware being different than the first version, wherein the additional container image corresponds to the second version of the firmware; and execute the additional container image, thereby causing the one or more devices to implement the second version of the firmware.

8. The non-transitory computer-readable medium of claim 7, wherein, when executed, the instructions cause the processing circuitry to:

determine whether the second version of the firmware is incompatible with the container image; and in response to determining that the second version of the firmware is incompatible with the container image, cause the additional container image to be sent to the edge device.

9. A computing device, comprising:

processing circuitry; and a non-transitory computer-readable medium comprising instructions that, when executed by the processing circuitry, cause the processing circuitry to:

send a first request to an edge device of an industrial automation system for information associated with a first set of operations of each of a plurality of devices communicatively coupled to the edge device, wherein the plurality of devices operate in an operational technology (OT) environment configured to communicate using one or more OT communication protocols, wherein the edge device is configured to communicatively couple to the plurality of devices and one or more information technology (IT) devices configured to communicate using one or more IT communication protocols in an IT environment;

receive, from the edge device, data indicative of one or more types of one or more devices of the plurality of devices, one or more types of data generated by the one or more devices, one or more operations performed by the one or more devices, and one or more components included in the one or more devices;

identify, based on the received data:

a container image stored in a container repository, wherein the container image comprises containerized maintenance software configured to utilize a maintenance model to determine one or more maintenance operations to be performed by the one or more devices;

retrieve the container image from the container repository;

send the container image to the edge device based on a desired machine state of the edge device; and execute the container image, thereby causing the one or more devices to perform the one or more maintenance operations, wherein the one or more maintenance operations comprise adjusting the one or more operations of the one or more components to avoid maintenance.

10. The computing device of claim 9, wherein, when executed, the instructions cause the processing circuitry to:

identify a firmware update for the one or more devices based on the received data, wherein the received data is indicative of firmware of the one or more devices;

determine, based on the firmware, an additional container image stored in the container repository, wherein the additional container image corresponds to updated firmware; and execute the additional container image, thereby causing the one or more devices to update the firmware of the one or more devices with respect to the updated firmware.

11. The computing device of claim 9, wherein the data is indicative of a network topology of a network utilized by the one or more devices of the industrial automation system.

12. The computing device of claim 9, wherein the one or more devices comprise a motor control centers, a motor, a human machine interface (HMI), an operator interface, a contactor, a starter, a sensor, a drive, a relay, a protection device, a switchgear, a compressor, a network switch, or a combination thereof.

13. The computing device of claim 12, wherein, the data is indicative of:

the one or more types of data being energy data; and the one or more devices including an overload relay.

* * * * *